(12) United States Patent
Antonuzzo

(10) Patent No.: US 10,239,303 B2
(45) Date of Patent: Mar. 26, 2019

(54) EQUIPMENT AND METHOD FOR AUTOMATIC PLASTICIZING

(71) Applicant: c/o S.E.M. Servizi Editoriali Milano S.P.A, Milan (IT)

(72) Inventor: Giovanni Antonuzzo, Milan (IT)

(73) Assignee: S.E.M. Servizi Editoriali Milano S.P.A., Milan (IT)

( * ) Notice: Subject to any disclaimer, the term of this patent is extended or adjusted under 35 U.S.C. 154(b) by 136 days.

(21) Appl. No.: 15/211,849

(22) Filed: Jul. 15, 2016

(65) Prior Publication Data
US 2017/0015093 A1   Jan. 19, 2017

(30) Foreign Application Priority Data

Jul. 16, 2015 (IT) ............................. UB2015A2253

(51) Int. Cl.
 B32B 41/00 (2006.01)
 B32B 38/18 (2006.01)
 (Continued)

(52) U.S. Cl.
 CPC ............. B32B 41/00 (2013.01); B32B 27/10 (2013.01); B32B 37/0053 (2013.01); B32B 38/185 (2013.01); B42C 7/00 (2013.01); B42C 7/009 (2013.01); B42C 19/02 (2013.01); *B32B 2317/12* (2013.01)

(58) Field of Classification Search
 CPC ... B32B 27/10; B32B 37/0053; B32B 38/185; B32B 41/00; B32B 2317/12; B42C 19/02; B42C 7/009; B42C 7/00; B42C 7/0008; B42C 7/008; B42C 7/007; B42C 9/0056; B42C 5/04; B42C 11/02; B42C 11/04; B26D 5/02; B26D 7/015; B26D 2007/0056; B42P 2261/04; Y10S 156/908; Y10T 156/1771; Y10T 156/1064; Y10T 156/1768; Y10T 156/1744
 See application file for complete search history.

(56) References Cited

U.S. PATENT DOCUMENTS 5,783,024 A * 7/1998 Forkert .................. B26D 1/305
                                                156/351
2007/0095920 A1* 5/2007 Eke .......................... B41J 3/385
                                                235/487

* cited by examiner

*Primary Examiner* — Vishal I Patel
(74) *Attorney, Agent, or Firm* — Banner & Witcoff, Ltd.

(57) ABSTRACT

An automatic plasticizing equipment (17) for image sheets (26) comprises a first plasticizing device (27) and an electronic control unit (22) for the plasticizing device and in which the first plasticizing device employs a first plasticizer film (28) unwinding from a first film spool (29). The plasticizing equipment (17) processes image sheets (26) with associated enhanced sheet codes (ESC), readable by machine, having dimension and finishing information associated to said image sheets (26). The equipment (17) further comprises a second plasticizing device (41), downstream of the first plasticizing device (27) for a second plasticizer film (42) of different typologies unwinding from a second film spool (43) for pre-forming plasticized image sheets (31, 44) of different typologies; and the electronic control unit (22) responds to the dimension and finishing information from the enhanced sheet codes (ESC) for selectively activating the first plasticizing device (27) or the second plasticizing device (41) or to leave the plasticizing devices deactivated so as to obtain plasticized image sheets (31, 44) of different typologies of plasticization or non-plasticized image sheets (46).

18 Claims, 7 Drawing Sheets

(51) Int. Cl.
*B42C 7/00* (2006.01)
*B32B 27/10* (2006.01)
*B32B 37/00* (2006.01)
*B42C 19/02* (2006.01)

EQUIPMENT AND METHOD FOR AUTOMATIC PLASTICIZING

RELATED APPLICATION

This application claims priority to Italian Application No. UB2015A002253 filed on Jul. 16, 2015 and entitled "Equipment and method for automatic plasticizing", the content of which is incorporated herein by reference in its entirety

FIELD OF THE INVENTION

The present invention relates to automatic plasticizing equipment and a plasticizing method for image sheets.

More specifically, the invention relates to automatic plasticizing equipment for image sheets comprising a first plasticizing device and an electronic control unit, in accordance with the introductory part of the main claim.

In a non-limiting embodiment, the equipment is used by a system for manufacturing books on demand, with assembling of covers and associated book blocks according to a programmed order. As a matter of fact, among the many needs of the publishing industry, it is important to get books in which the covers can maintain the original appearance even after prolonged use. One solution is the provision of carrying out plasticized covers, but problems arise when a plasticization of different typology, for example a mat plasticizing in alternative to a glossy plasticizing, is requested.

BACKGROUND OF THE INVENTION

Patent EP 2 289 823 in the name of Tecnau Srl and Rotomail Italy Spa discloses a system for manufacturing books with a binder that uses book blocks and covers of different dimensional characteristics. In a respective embodiment, the covers are printed in sequence, as cover sheets, on a cover strip wound on a spool. The cover sheets are separated from an unwinding strip to form the covers, which are successively assembled with the associated book blocks. Such system operates with spools for the book blocks and spools for the covers, which are printed by specialized printing systems and ensures great flexibility to the editorial requirements, with high operating speed and limited cost.

A system for manufacturing books on demand with plasticizing of the covers has been described in the U.S. Pat. No. 6,986,630. This system comprises a printer for book blocks, a printer for the covers with a plasticizing device and a binder for assembling the covers with the associated book blocks. The plasticizing device applies two plasticizing films on the two faces of the covers, in response to a request of cover by the binder. The films are unwound from two film spools, separated from the spools and applied to the covers along a path from the cover printer to an input of the binder. The process is controlled on the basis of a program and indications from a sensor which detects the passages of a leading edge and a trailing edge of the covers. No particular procedure is disclosed for the substitution of the plasticizing films. Therefore, in a system of this type, for obtaining covers having different typologies of plasticization, a manual substitution of the plasticizing films would be required in accordance with the specific publishing requests, and necessarily high replacement times.

In the system of the cited patent EP 2 289 823, for manufacturing books with plasticized covers, the cover sheets must be separated from a cover strip or cover sheets which have been previously plasticized with the desired typology. Therefore, the processing of different types of plasticized covers and non-plasticized covers requires the provision of different plasticizing lines and the manual replacement of the covers spools, with a consequent increase of costs and processing times.

SUMMARY OF THE INVENTION

An object of the invention is therefore to provide an equipment for the automatic plasticization of covers designed for a system for manufacturing books on demand with plasticized covers of different typologies, e.g. mat and glossy plasticization, and non-plasticized covers, having high operating speed and relatively low costs.

The problem of automatic plasticization with different typologies of plasticization is felt by the publishing industry and the printing industry in general, also in fields other than the manufacturing of books, such as for producing tickets and folded leaflets.

Another object of the invention is therefore to provide an equipment for the automatic plasticization of image sheets, which can manufacture plasticized image sheets of different typologies, e.g. mat and glossy plasticization, and non-plasticized image sheets, at high-speed and relatively low costs.

In accordance with these object, the automatic plasticizing equipment of the present invention is fed with an image strip unwinding from an image spool and which supports enhancing sheet codes, readable by machine, having dimension and finishing information associated to the image sheets. The equipment also comprises a second plasticizing device, downstream of the first plasticizing device for a second plasticizer film of different typologies unwinding from a second film spool for pre-forming plasticized image sheets of different typologies. The electronic control unit responds to the dimension and finishing information from the enhancing sheet codes for selectively activating the first plasticizing device or the second plasticizing device or to leave the plasticizing devices deactuated so as to obtain plasticized image sheets of different typologies of plasticization or non-plasticized image sheets.

Another object of the invention is to provide an automatic plasticizing method for image sheets of different typologies with high operational speed and low operating costs.

The method for plasticizing sheets of image provides an automatic plasticizing equipment including a first plasticizing device and an electronic control unit wherein the first plasticizing device employs a first plasticizer film unwinding from a first film spool. In particular, this method is associated to a plasticizing equipment which comprises a second plasticizing device for a second plasticizer film with different typology unwinding from a second film spool for pre-forming plasticized image sheets of different typology and includes the steps: a) feeding the plasticizing equipment with an image strip unwinding from an image spool, wherein the image sheets are arranged in sequence along the image strip and wherein the image strip supports enhancing sheet codes, readable by machine, having information on dimensions and finishing associated to the image sheets; and b) selectively actuating the first plasticizing device or the second plasticizing device, on control of the electronic unit and in response to dimensional and finishing information from the enhancing sheet codes for achieving plasticized image sheets of different typologies of plasticization or leaving deactuated the first plasticizing device and the second plasticizing device for achieving non-plasticized image sheets.

The equipment of automatic plasticizing of the present invention can be conveniently employed in an enhancing station for image sheets of general purpose or in a system for manufacturing books on demand with different enhancing devices, for manufacturing enhanced image sheets or covers of different typologies.

BRIEF DESCRIPTION OF THE DRAWINGS

The characteristics of the invention will become clear from the following description, given purely by way of non-limiting example, with reference to the appended drawings in which.

DETAILED DESCRIPTION OF THE PREFERRED EMBODIMENTS

Figure 1:
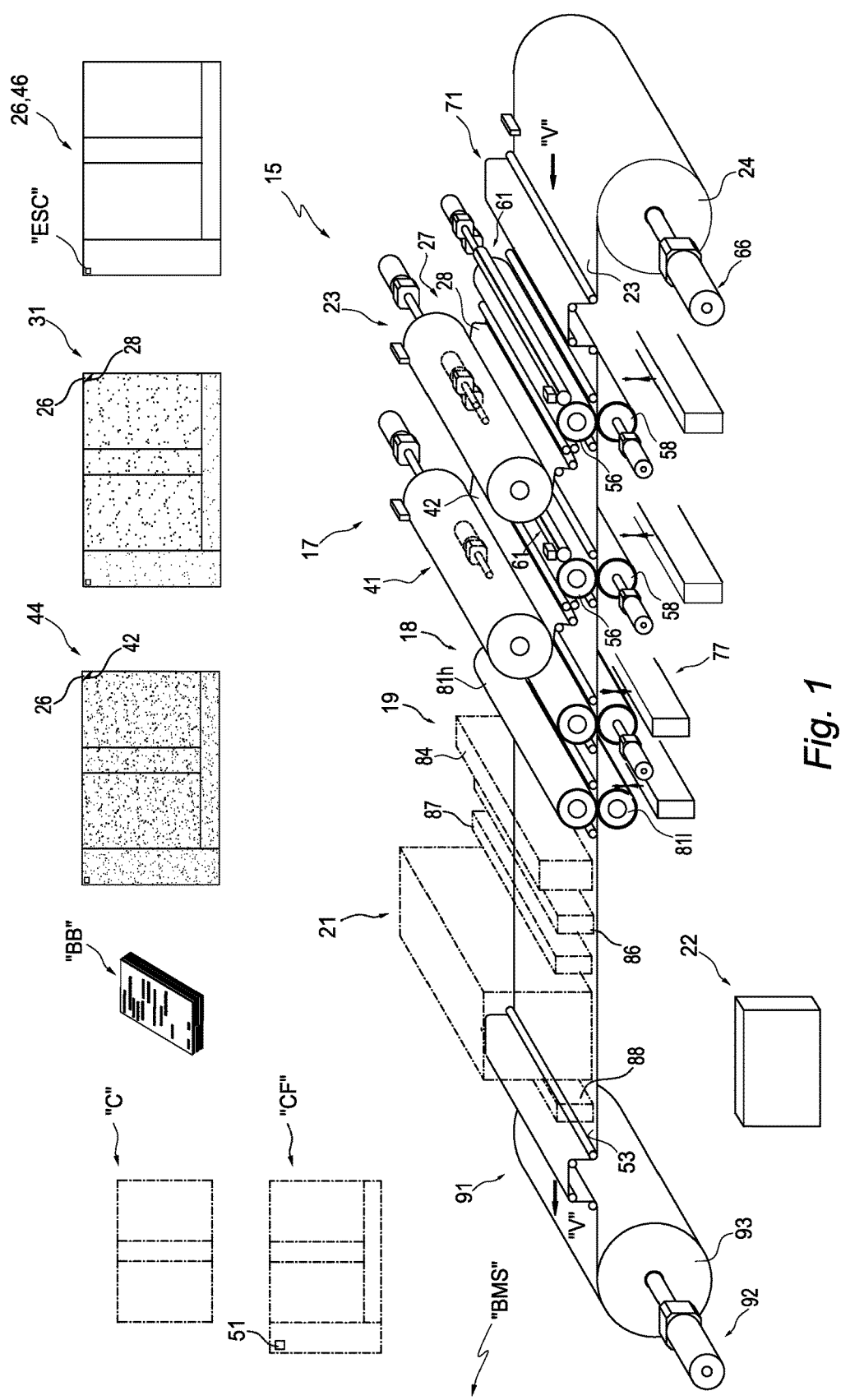
FIG. 1 represents a schematic diagram of an enhancing station for image sheets, with an automatic plasticizing equipment of the invention and other enhancing devices for a system for manufacturing books on demand.

With reference to FIG. 1, an automatic enhancing station for image sheets is represented with 15. The station 15 is designated for producing enhanced cover sheets from strip-shaped supports in spool, in a system for manufacturing books on demand, not shown, represented with "BMS". The enhancing station 15 can also be used for enhancing other image sheets, as cardboard sheets for tickets or folded leaflets from supports wrapped in spool.

Figure 2:
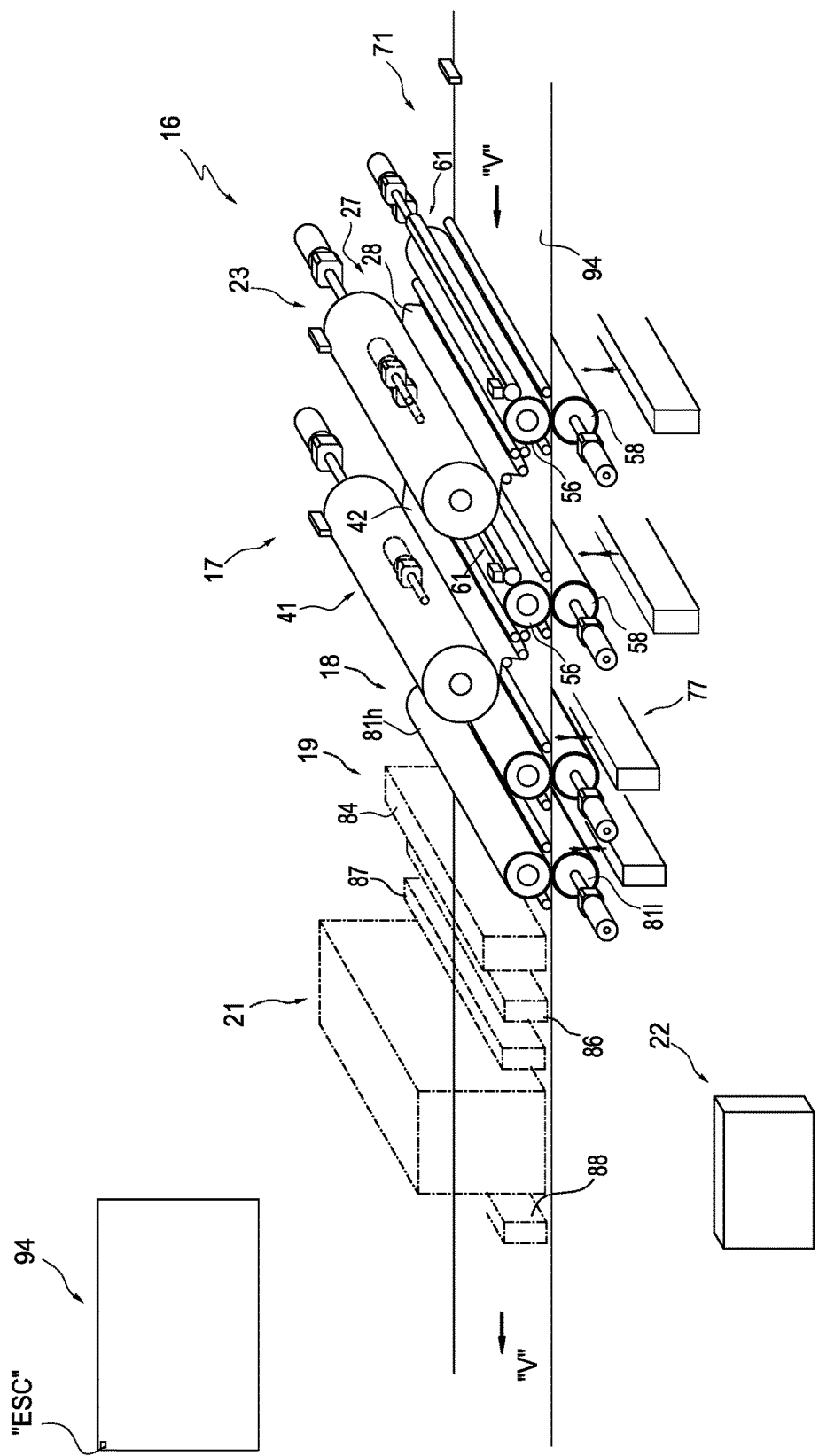
FIG. 2 is a schematic diagram of a enhancing station for image sheets, with an automatic plasticizing equipment of the invention and other enhancing devices of general purpose.
Figure 3:
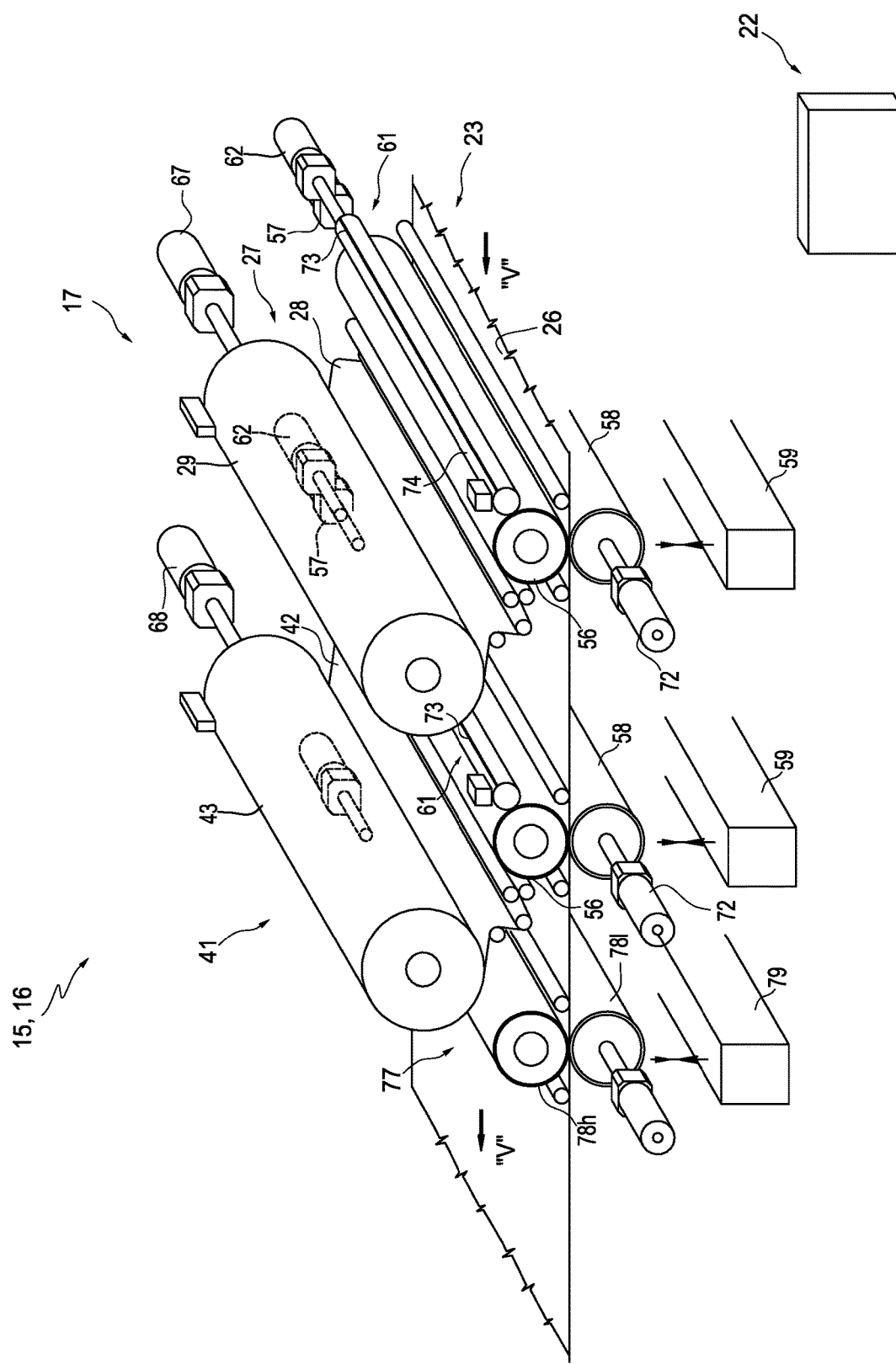
FIG. 3 shows a diagram, on an enlarged scale, of the plasticizing equipment represented in the FIGS. 1 and 2.
Figure 4:
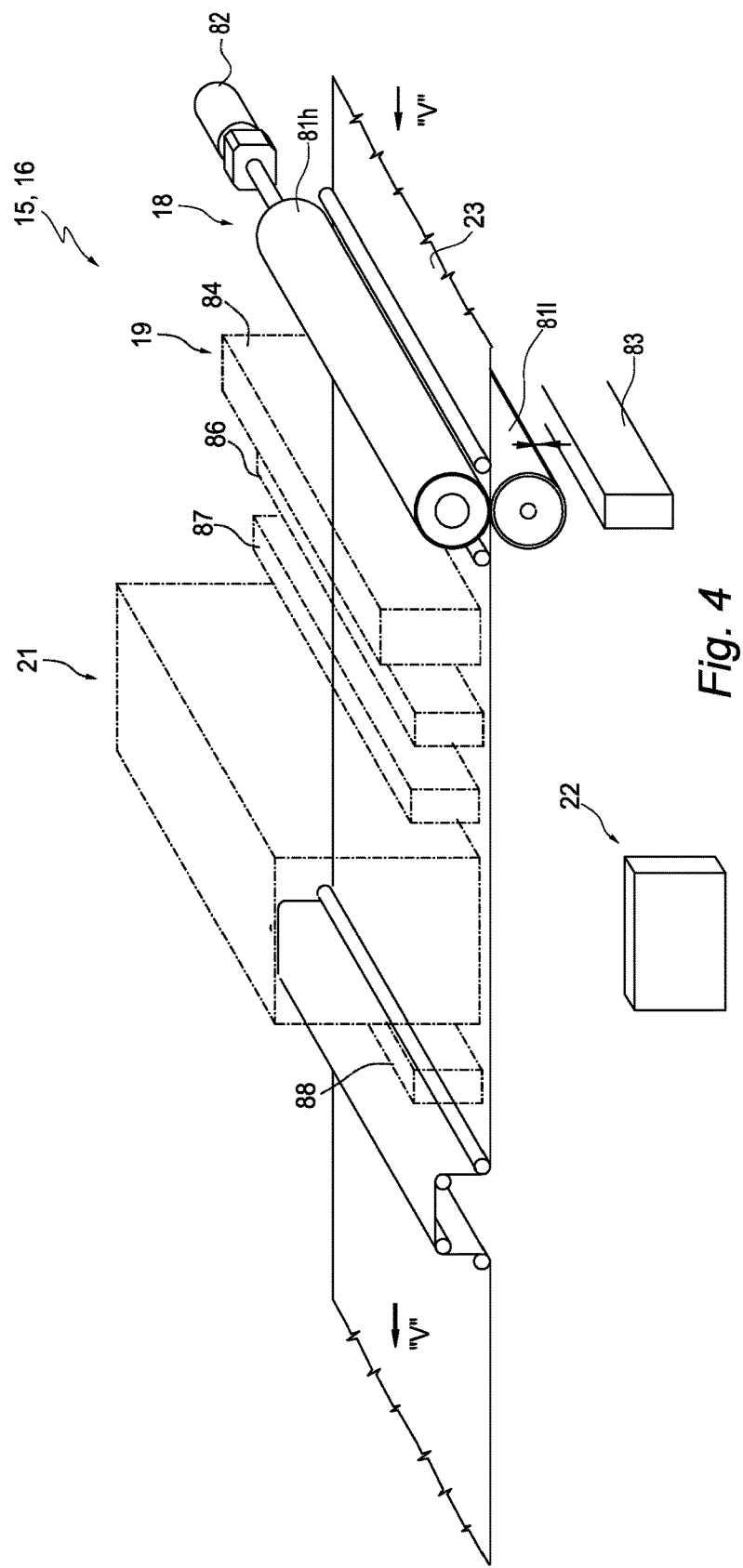
FIG. 4 is a diagram, on an enlarged scale, of some components employed by the enhancing stations for image sheets of FIGS. 1 and 2.

An automatic enhancing station 16 for producing enhanced image sheets for general purpose is shown In FIG. 2. For example, the station 16 can enhance cardboard sheets for tickets or folded leaflets from individual sheets.

The automatic enhancing stations 15 and 16 (FIGS. 1, 2, 3 and 4) comprise in particular a plurality of enhancing devices including an automatic cover plasticizing equipment 17, and/or one or more of an embossing device 18, a metalizing device 19 and a browning device 21 and an electronic control unit 22.

As for the enhancing devices 17, 18, 19 and 21, the description which follows is directed to the automatic enhancing station 15 for cover sheets designated for a system for manufacturing books on demand "BMS". However, this description is alike applicable for enhancing generic image sheets obtained from an image strip wound in spool and to the enhancing station 16 employing the image sheets with supports constituted by individual sheets.

The system for manufacturing books on demand "BMS" is of the type described in the aforementioned patent EP 2 289 823. In summary, the system "BMS" derives covers "C" (FIG. 5) from corresponding cover sheets "CS" and assembles the covers "C" with associated book blocks "BB" according to a programmed order. The cover sheets "CS" are printed, in sequence, by specialized printers and on the basis of a program, along a cover strip "CW". The cover strip unwinds from a cover spool and includes, adjacent to a leading edge of each cover sheet, a cover code "CC" readable by machine. The system "BMS" extracts dimensional information and finishing information from the cover codes "CC" and uses that information for the production of the covers "C".

In detail, for a series of associated book blocks BB-a, BB-b, BB-c, BB-m, the cover strip "CW" comprises in sequence a corresponding series of cover sheets CS-a, CS-b CS-c, . . . CS-m.

Figure 5:
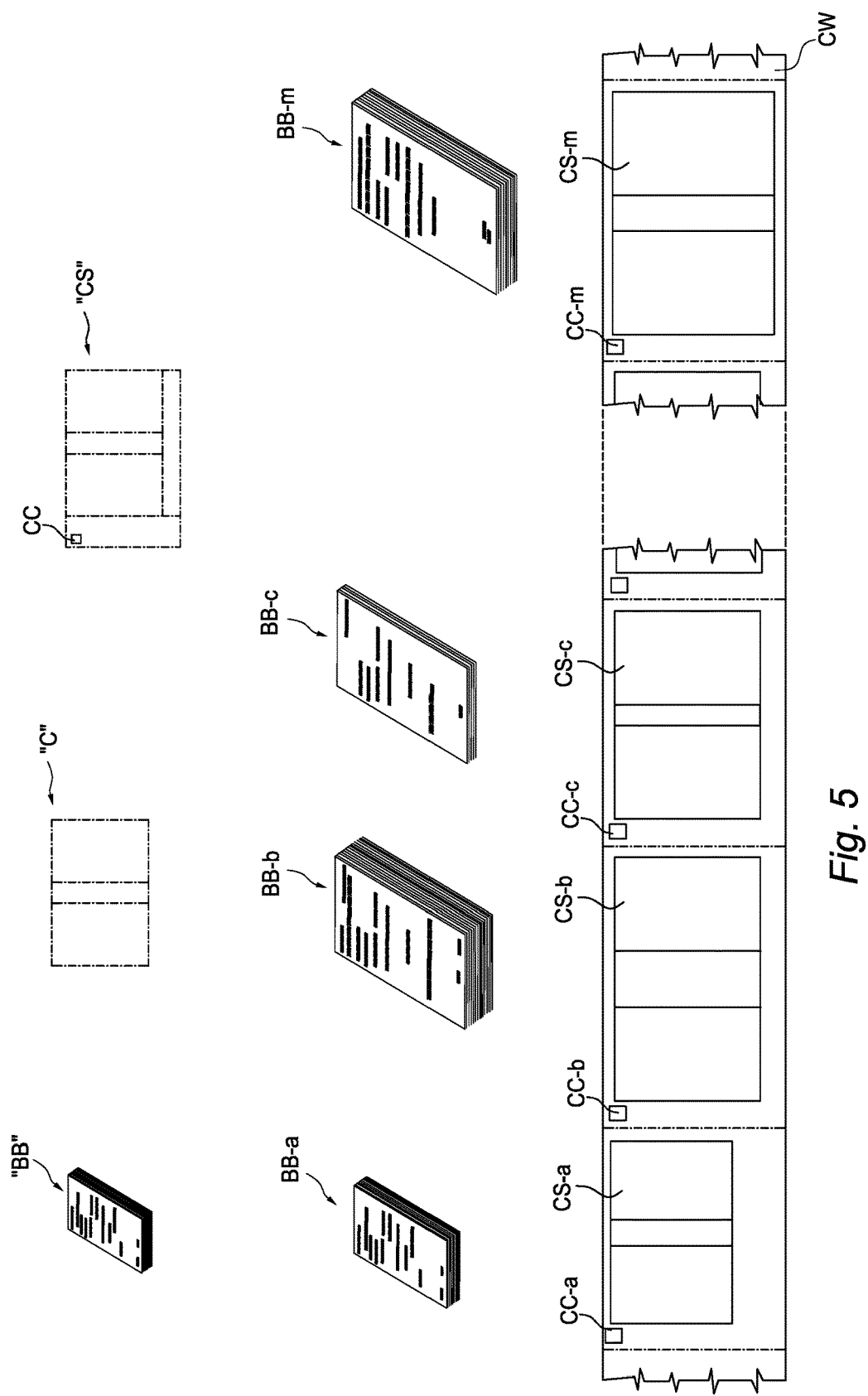
FIG. 5 schematically represents a diagram of some components employed by the plasticizing equipment of FIG. 1.
Figure 6:
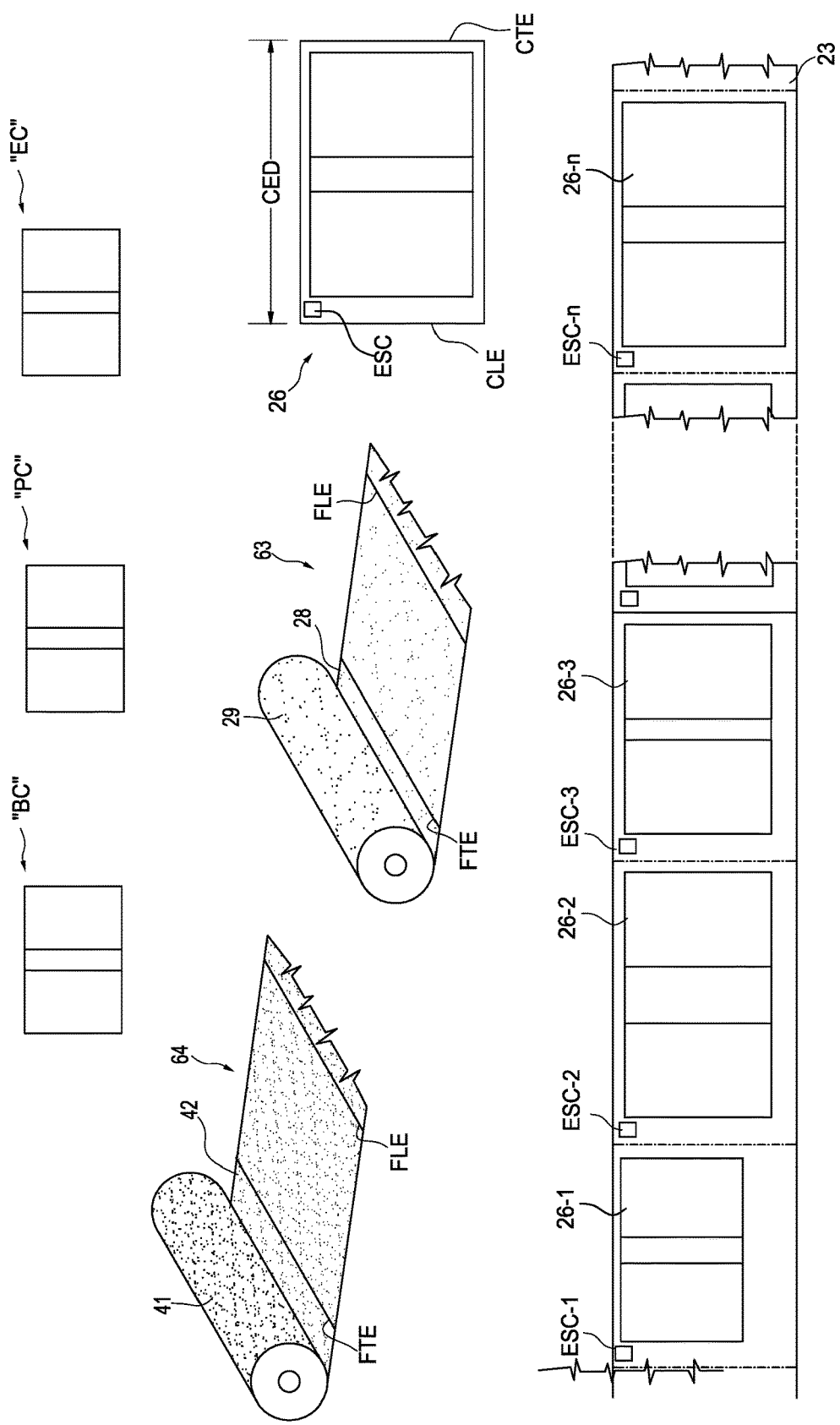
FIG. 6 represents another diagram of components employed by the plasticizing equipment of FIG. 1.
Figure 7:
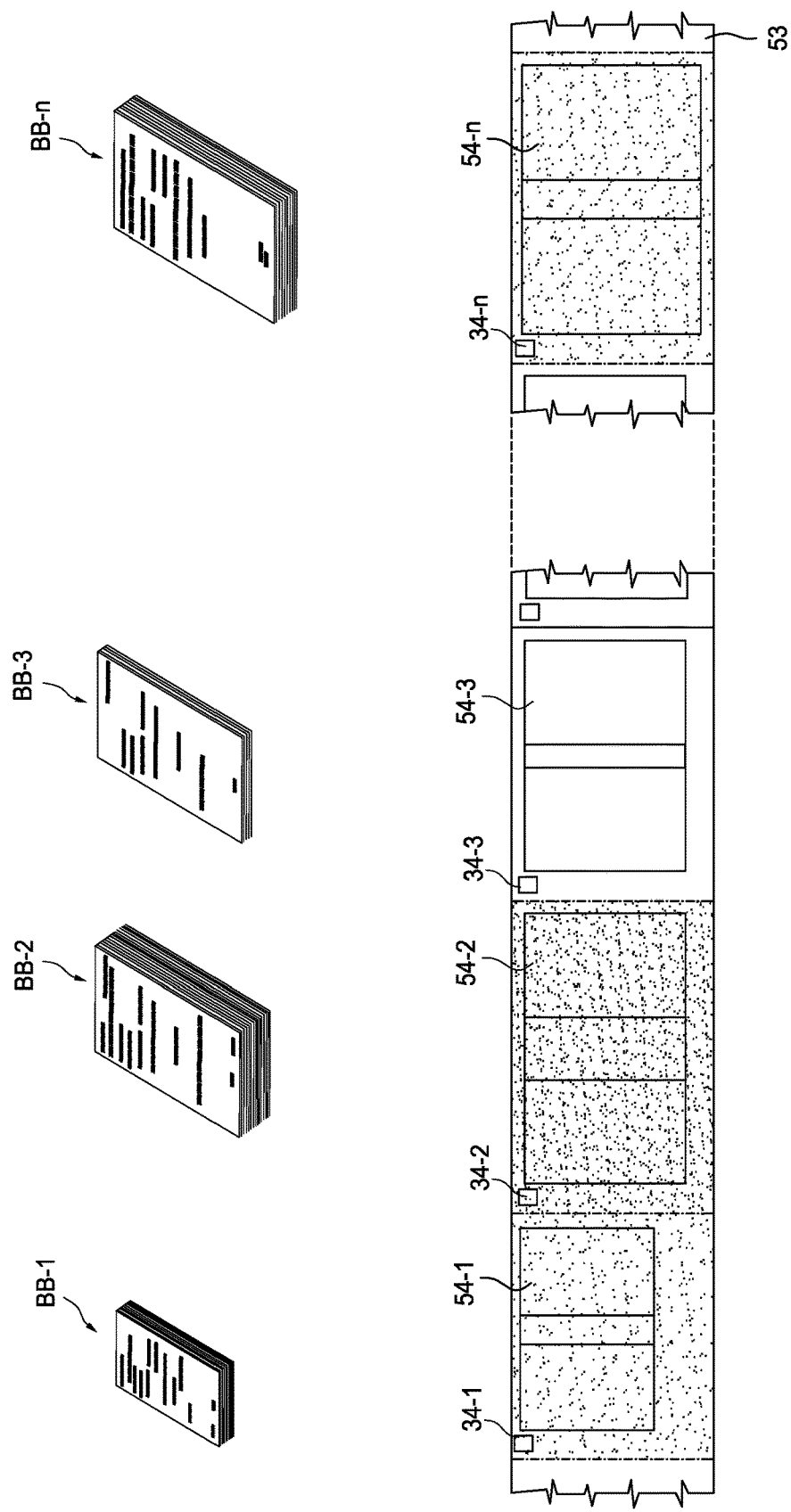
FIG. 7 shows a further diagram of components employed by the plasticizing equipment of FIG. 1 and by an associated system for manufacturing books on demand.

The enhancing station 15 (FIG. 1) is supplied with an image strip 23, similar to the cover strip "CW" of FIG. 5, which unwinds from an image spool 24 and operates on image sheets 26 similar to the cover sheets "CS" of FIG. 5. The image sheets 26 (FIG. 6) are arranged in sequence along the image strip 23 in accordance with the programmed order for the production of the books. Thus, for a number of associated book blocks BB-1 BB-2, BB 3, BB-n . . . , (see FIG. 7) the image strip 23 comprises, in sequence, a corresponding series of image sheets 26-1, 26-2, 26-3, . . . 26-n. The strip 23 supports, adjacent to an edge of each cover sheet, enhanced sheet codes "ESC" readable by machine, similar to the cover codes "CC" of FIG. 3. The enhanced codes ESC-1, ESC-2, ESC-3 . . . ESC-n include dimensional information and associated finishing information for the covers "C" employable by the system "BMS" and specific enhancement information on enhancements to be effected.

The cover plasticizing equipment 17 (FIGS. 1, 2 and 3) comprises a first plasticizing device 27 which employs a first plasticizing film 28 unwinding from a first film spool 29. The plasticizing device 27 is actuatable on control of the electronic unit 22 for applying the plasticizing film 28 on the image sheets 26 and pre-forming plasticized image sheets 31 (see FIG. 1) or, when the plasticizing device 27 is not actuated, for leaving unchanged the image sheets 26. For example, a glossy plasticized image sheet can be obtained with a glossy plasticizing film 28.

In accordance with the invention, the cover plasticizing equipment 17 (FIGS. 1, 2 and 3) comprises a second plasticizing device, represented with 41, arranged downstream of the first plasticizing device 27 and also actuatable by the electronic control unit 22. The plasticizing device 41 uses a second plasticizing film 42 of type different with respect to the one of the first plasticizing film 28.

The second plasticizing film 42 unwinds from a second film spool 43 and is used by the device 41 for pre-forming, from the image sheets 26, plasticized image sheets 44 (see FIG. 1) of different typologies with respect to the plasticized image sheets 31. For example, a mat plasticized image sheet can be obtained from a mat plasticizing film 42 in alternative to the glossy plasticizing film 28 of the first plasticizing device 27. When not actuated, the plasticizing device 41 does not affect the image sheets 26, emerging from the first plasticizing device 27.

The electronic control unit 22 responds to the dimensional and finishing information of the enhanced sheet codes "ESC" and to the enhancement information for selectively actuating the first plasticizing device 27 or the second plasticizing device 41 or to let off the two devices so as to produce plasticized image sheets 31 or 44 of different typologies of plasticizing or non-plasticized image sheets 46 equal to the image sheets 26 (see FIG. 1).

Therefore, the system for manufacturing books on demand can use, as cover sheets "CS", the plasticized image sheets 31 or 44 or non-plasticized image sheets 46 and/or image sheets further enhanced by the enhancing devices 18, 19 or 21. As a result, the system "BMS" can produce from the cover sheets "CS" plasticized covers "PC" (see FIG. 6) of different typologies, or non-plasticized covers "BC", or otherwise enhanced covers "EC", to be assembled with the associated book blocks "BB" according to a programmed order and without substantial changes with respect to the manufacturing of books having standard covers.

For the series of associated book blocks BB-1 BB-2, BB-3, BB-n . . . , (FIG. 7), an enhanced image strip 53 emerging from the cover plasticizing equipment 17 and the other enhancing devices 18, 19 and 21, if present, will comprise, in sequence, enhanced image sheets 54-1, 54-2, 54-3, . . . 54-$n$, derived from the image sheets 26-1, 26-2, 26-3, . . . 26-$n$ and including the plasticized image sheets 31 or 44 or the non-plasticized image sheets 46 (see FIG. 1) or the otherwise enhanced image sheets, according to the specific editorial requests.

In detail, each plasticizing device 27, 41 (FIGS. 1 and 3) comprises a taking roller 56 driven by a taking servo-mechanism 57 for the plasticizing film 28, 42, a pinch roller 58 with a roller shift mechanism 59 for the plasticization of the covers and a cutting member 61 driven by a cutting servo-mechanism 62 for the plasticizing film 28, 42.

The taking roller 56 is rotatable by the taking servo-mechanism 57 for receiving and taking a terminal section 63, 64 (see FIG. 6) of the plasticizing films 28, 42 unwinding from the film spool 29, 43. The image strip 23 unwinding from the image spool 24 is pinched between the taking roller 56 and the pinch roller 58 of the first plasticizing device 27 and prosecutes toward the other enhancing devices 18, 19 and 21, with interposition of the plasticizing device 41 between the taking roller 56 and the pinch roller 58.

According to a known technique, the terminal section 63, 64 of the plasticizing film 28, 42 may be taken by the taking roller 56 (FIG. 3) and adhere to the roller by electrostatic action. Alternatively, the taking roller is hollow and provided with peripheral suction and holding holes, while the terminal section of the plasticizing film may be held by the taking roller 56 by vacuum through the suction and the holding holes.

The roller shifting mechanism 59 is actuatable, on control by the electronic unit 22, for moving the pinch roller 58 from a rest position, spaced away from the taking roller 56, to a working position in contrast with the taking roller 56. In the rest position, the pinch roller 58 allows a free passage of the image strip 23. In the working position, the pinch roller 58 exercises a pressure between the image strip 23 and the plasticizing film 28, 42 against the taking roller 56 jointly with a traction of the taking roller on the image strip and the plasticizing film.

The servo-mechanism 62 drives the cutting member 61 for cutting the plasticizing film 28, 42. In turn, the electronic control unit 22 responds to the dimensional and finishing information from the enhanced sheet codes "ESC" for actuating the taking servo-mechanism 57, the roller shifting mechanism 59 and the cutting servo-mechanism 62 of the plasticizing device 27 or 41, functionally to the fixing of the terminal section 63, 64 of the plasticizing film 28, 42 on the image sheet 26 and to the separation of the terminal section 63, 64.

In the automatic enhancing station 15, the image spool 24, the film spool 29 and the film spool 43 are connected to respective image spool servo-mechanism 66 and film spool servo-mechanisms 67 and 68. The electronic unit 22 controls the servo mechanisms 66, 67 and 68 for ensuring, without tearing and optimal tension, the controlled unwinding of the image strip 23 at a velocity "V" and the feeding of the plasticizing films 28 and 42 in accordance with the actuation of the plasticizing devices 27 and 41.

The cover plasticizing equipment 17 comprises guiding and moving means of known type, generally represented with 71 for longitudinally moving the image strip 23, continuously at an operating speed "V" through the plasticizing devices 27 and 41 and the other enhancing devices 18, 19 and 21.

Each terminal section 63, 64 of the plasticizing film 28, 42 defines a film leading edge "FLE" (see FIG. 6) to be held by the taking roller 56 and a film trailing edge "FTE". Each cover sheet 26 defines a cover leading edge "CLE" and a cover trailing edge "CTE". The edges "CLE" and "CTE" are at an edge distance "CED", which is associated to the width or height of the cover "C" for the associated book blocks "BB".

The electronic unit 22 controls, relatively to the first plasticizing device 27 or the second plasticizing device 41 (FIGS. 1 and 3), the taking servo-mechanism 57, jointly to the working position of the pinch roller 58. It for rotating the taking roller 56 in synchronism with the operating velocity "V" of the image strip 23 so as to apply the plasticizing film 28 or 42 with substantial alignment between the film leading edge "FLE" (see FIG. 6) and the cover leading edge "CLE". In turn, the electronic unit 22 controls the cutting servo-mechanism 62 for cutting the terminal section 63, 64 held by the taking roller 56 for a distance corresponding to the edge distance "CED", defining the film trailing edge "FTE" to be fixed in substantial alignment with the trailing edge "CTE".

The pinch roller 58 of the plasticizing devices 27 and 41 are driven by respective pressing servo-mechanisms 72 controlled by the electronic unit 22 for a peripheral speed in synchronism with the operating speed "V" of the image strip 23. It for ensuring that the strip 23 and the plasticizing film 28 or 42 move ahead together without sliding.

In each plasticizing device 27, 41, the cutting member 61 comprises a blade 73 arranged along a generatrix of a cutting roller 74 arranged parallel to the taking roller 56. The cutting servo-mechanism 62 rotates selectively the cutting roller 74 for shifting the blade 73 from an inoperative position to a cutting position against the taking roller 56 and returning the blade into the inoperative position after the cutting of the terminal sections 63, 64.

The plasticizing films 28 and 42 are provided with an hot applicable adhesive, while each taking roller 56 is of a heated type for a hot bonding of the plasticizing films 28 and 42. In alternative, plasticizing films 28 and 42 operating with cold adhesive can be also used.

The enhancing station 15 comprises, downstream of the first plasticizing device 27, a rotary press 77 with an upper cylinder 78*h*, a lower cylinder 78L and a shifting mechanism 79 for the lower cylinder 78L, controlled by the electronic unit 22. In operative conditions, the cylinders 78*h* and 78L are in synchronism with the image strip 23, while the shifting mechanism 79 is actuated for carrying the lower cylinder 78L against the upper roller 78*h*, with optimal plasticizing of the plasticized image sheets by the plasticizing device 28 or the plasticizing device 41. For non-plasticized image sheets, the shifting mechanism 79 is off and the lower cylinder 78L is spaced away from the upper cylinder 78*h* for an easy passage of the non-plasticized image sheets.

For what concerns the realization of the other enhancement features, the embossing device 18 comprises an upper embossing cylinder 81h, a lower cylinder 81L of contrast for the cylinder 81h, a servo-mechanism 82 for the embossing cylinder and a displacement mechanism 83 for the cylinder of contrast 81h. The cylinder 81h comprises a plurality of embossing elements on given sectors of its peripheral surface.

In operating conditions, the lower cylinder 81L is in synchronism with the image strip 23, and the servo mechanism 82, on control of the electronic unit 22 and in response to information from the enhanced sheet codes "ESC", drives the lower cylinder 81h in order to select the sector with a desired embossing element and brings that element in synchronism with the speed of the image strip 23 opposite to an area of impression of the cover sheet or the image sheet to be embossed. In turn, the shift mechanism 83 is actuated to bring the cylinder 81h against the opposing cylinder 81L, for embossing, on the fly, the cover sheet or the image sheet in a desired area of embossing. For image sheets to be non-embossed, the shifting mechanism 83 is switched off and the cylinder 81h is far away from the cylinder 81L for a free movement of the image strip 23.

The metalizing device 19 is disposed downstream of the plasticizing devices 27 and 41 and can employ an ink jet printing unit 84 and an UV spot device 86 downstream from the printing unit 84. The printing unit is controlled by the electronic unit 22 and in response to information from the enhanced sheet codes "ESC" effects a metallization or other coating in selected areas of the image sheet 26. Further, the UV spot device 86 is actuatable for fixing in optimal way a metallization or other coating on the cover sheet or image sheet of the image strip 23.

The browning device 21 employs a leaf pressing technology and is arranged downstream of the metalizing device 19. The device 21 is preceded, in the direction of advance of the image strip 23, by an ink jet gluing unit 87 and is followed by a UV spot device 88. On control by the electronic unit 22 and in response to information from the enhanced sheet codes "ESC", the gluing unit 87 can be actuated for preparing the cover sheet or image sheet, by depositing a layer of glue in the areas to be browned. In turn, the browning device 21 can be actuated for pressing with gluing the parts of the browning leaf with the desired profile into the prepared areas and separate the non-used parts of the leaf. The UV spot device 88 is actuatable for an optimally execution of the browning on the cover sheet or image sheet of the image strip 23.

The automatic enhancing station 15 can comprise a winding device 91 with a servo-mechanism 92. The electronic unit 22 controls the servo-mechanism 92 for winding an enhanced image spool 93 for the enhanced image strip 53 with the plasticized image sheets 31 and 44, the image sheets also processed by the devices 18, 19 and 21 and the non-processed image sheets.

The system for manufacturing books on demand "BMS" uses the enhanced image spool 93, by processing the enhanced image strip 53 in a similar way with respect to the spools for cover sheets of a single type of finish, without any lengthening of the production time.

As previously reported, the image sheets 26, the image strip 23, the image spool 24 and the enhanced sheet codes "ESC" can be used for editorial products different from the covers, for example cardboard for tickets or folded leaflets from supports wrapped in spool. The mode of operation of the enhancing station 15 is similar to that for the realization of the cover sheets and also the relative enhanced sheets can be wrapped in the enhanced image spool 93 to be processed by cutting and collecting equipments and, possibly, by folding equipments, on the basis of dimensional information and other specific information from the "ESC" codes.

The image sheet enhancing station 16 (FIG. 2) operates on image sheets 94, similar to the image sheets 26 and of support for the respective enhanced sheet codes "ESC". The station 16 is supplied with individual image sheets extracted from a supply magazine (not shown). In turn, the enhanced image sheets can be collected in a, not shown, collection magazine.

Also for the single-sheet feed, the image sheets 94 are provided for advancing at the velocity "V" and, for what it concerns the plasticizing, embossing, metallizing and browning of the image sheet 94 the operation of the station 16 is the same of the one described for the image sheets 26.

Naturally, the principle of the invention remaining the same, the embodiments and the details of construction of the automatic plasticizing equipment for image sheets and the relative method can broadly be varied with respect to what has been described and illustrated, by way of non-limitative example, without by this departing from the ambit of the present invention.

I claim:

1. An automatic plasticizing equipment for image sheets comprising a first plasticizing device including a first film spool and an electronic control unit for the automatic plasticizing equipment and, wherein said first plasticizing device employs a first plasticizer film unwinding from said first film spool, wherein
said equipment processes image sheets with associated enhanced sheet codes (ESC), readable by machine, having dimension and finishing information associated to said image sheets;
said equipment further comprises a second plasticizing device arranged downstream from the first plasticizing device, in which said second plasticizing device includes a second film spool and employs a second plasticizer film of different typologies unwinding from said second film spool for pre-forming plasticized image sheets of different typologies; and wherein
the electronic control unit responds to the dimension and finishing information from said enhanced sheet codes (ESC) for selectively activating the first plasticizing device or the second plasticizing device, or to leave deactivated the first plasticizing device and the second plasticizing device so as to obtain plasticized image sheets of different typologies of plasticization or non-plasticized image sheets.

2. The automatic plasticizing equipment according to claim 1, wherein said equipment is associated to an image strip spool with an image strip, wherein the image sheets are arranged along said image strip, while said equipment is fed with said image strip, which unwinds from an image strip spool, and wherein said image strip supports the enhanced sheet codes (ESC) associated to said image sheets.

3. The automatic plasticizing equipment according to claim 2, wherein said equipment is associated to a system for manufacturing books on demand (BMS) with assembling of covers (C) and associated book blocks (BB) according to a programmed order for books of destination, while said image sheets are designed for pre-forming plasticized covers (PC) for the books of destination;
the image sheets constitute cover sheets for said covers while the image strip constitutes a cover strip of the system for manufacturing books on demand (BMS);

the image sheets are arranged in sequence along the image strip according to the programmed order of the books of destination;

the second plasticizing device is actuatable for pre-forming plasticized covers of different typologies, and the electronic control unit responds to the dimension and finishing information from the enhanced sheet codes (ESC) for selectively activating or leaving deactivated the first plasticizing device or the second plasticizing device so as to obtain plasticized covers of different typologies or non-plasticized covers.

4. The automatic plasticizing equipment according to claim 1 further comprising a rotary press for completing plasticizing of plasticized image sheets.

5. The automatic plasticizing equipment according to claim 1, wherein said equipment is included in an image sheets enhancing station which further comprises an embossing device, a metalizing device and a browning device arranged downstream of the second plasticizing device and wherein said embossing device, said metalizing device and said browning device are provided, respectively, for embossing, metalizing and browning plasticized or non-plasticized image sheets.

6. The automatic plasticizing equipment of claim 5, wherein the metalizing device is of ink jet type and wherein, downstream from the metalizing device, said image sheets enhancing station further comprises a fixing UV spot device.

7. The automatic plasticizing equipment of claim 5, wherein said browning device is of metal-foil type and is preceded by a gluing device of ink jet type, and wherein said gluing device is controlled by the electronic control unit for depositing an adhesive layer in areas of an image sheet provided for the browning.

8. The automatic plasticizing equipment according to claim 1, wherein said equipment is fed by an image strip for the image sheets and each of the first plasticizing device and the second plasticizing device comprises a taking roller with a taking servomechanism for the second plasticizer film, a pinch roller with a roller shifting mechanism for plasticizing the image sheets and a cutting member with a cutting servomechanism for the second plasticizer film; wherein the taking roller is driven by the taking servomechanism for receiving and taking an end section of the plasticizer film unwinding from the respective film spool;

the image strip is interposed between the taking roller and the pinch roller;

the roller shifting mechanism is provided for moving the pinch roller from a rest position spaced away from the taking roller, for a free passage of the image strip, to a working position in which the pinch roller pinches the image strip and the second plasticizer film against the taking roller;

the cutting member is actuatable by the cutting servomechanism for cutting the second plasticizer film; and the electronic control unit responds to the dimension and finishing information from the enhanced sheet codes (ESC) for driving the taking servomechanism, the roller shifting mechanism and the cutting servomechanism of the first or the second plasticizing device, functionally to fixing of the end section of the second plasticizer film on the image sheets and separation of said end section.

9. The automatic plasticizing equipment according to claim 8, further comprising guiding and moving means for moving the image strip longitudinally at a operating speed (V), wherein the end section of the second plasticizer film defines a leading edge of a film (FLE) retained by the taking roller while each image sheet of the image sheets defines a leading edge and a trailing edge of each respective image sheet;

wherein said leading edge and said trailing edge are arranged at an edge distance (CED) associated with a width or height of each respective image sheet;

wherein the electronic control unit controls, relatively to the first or second plasticizing device, the taking servomechanism, jointly with the working position of the pinch roller, for rotating the taking roller in synchronism with the operating speed of the image strip so as to apply the first plasticizer film or the second plasticizer film with substantial alignment between the leading edge of the film and the leading edge of the image sheet; and wherein said electronic control unit controls the cutting servomechanism for cutting the end section retained by the taking roller for a length corresponding to said edge distance (CED) and defining a trailing edge of a film (FTE) to be fixed substantially aligned with the trailing edge of the image sheet.

10. The automatic plasticizing equipment according to claim 8, wherein said equipment is associated to a system for manufacturing books on demand (BMS) with assembling of covers (C) and associated book blocks (BB) according to a programmed order for books of destination, while said image sheets are designed for pre-forming plasticized covers (PC) for the books of destination;

the image sheets constitute cover sheets for said covers while the image strip constitutes a cover strip of the system for manufacturing books on demand (BMS);

the cover sheets are arranged in sequence along the cover strip according to the programmed order of the books of destination;

the second plasticizing device is actuatable for pre-forming plasticized covers (PC) of different typologies, and the electronic control unit responds to the dimension and finishing information from the enhanced sheet codes (ESC) for selectively activating or leaving deactivated the first plasticizing device or the second plasticizing device so as to obtain plasticized covers of different typologies or non-plasticized covers.

11. The automatic plasticizing equipment according to claim 10, further comprising guiding and moving means for moving the cover strip longitudinally at a operating velocity (V), the end section of the first plasticizer film defines a film leading edge of the film (FLE) retained by the taking roller while each cover sheet defines a leading edge (CLE) and a trailing edge of cover (CTE);

wherein said leading edge and said trailing edge of each of the cover sheets are arranged at an edge distance (CED) associated with a width or height of a cover (C) for the associated book blocks;

wherein the electronic control unit controls, relative to the first plasticizing device or the second plasticizing device, the taking servomechanism, jointly with the working position of the pinch roller, for rotating the taking roller in synchronism with the operating velocity of the cover strip so as to apply the first plasticizer film or the second plasticizer film with substantial alignment between the film leading edge and a leading edge of the cover; and wherein said electronic control unit controls the cutting servomechanism for cutting the end section retained by the taking roller for a length corresponding to the edge distance (CED) and defining a film trailing edge of the film (FTE) to be fixed substantially aligned with the trailing edge of each of the cover sheets.

12. The automatic plasticizing equipment according to claim 1, wherein, relative to the first plasticizing device or the second plasticizing device, the taking roller takes the end section of the first plasticizer film or second plasticizer film by electrostatic action.

13. The automatic plasticizing equipment according to claim 8, wherein, relative to the first plasticizing device or the second plasticizing device, the cutting member comprises a cutting roller with a blade, wherein said blade is arranged along a generatrix of the cutting roller parallel to the taking roller and wherein the cutting servomechanism rotates selectively the cutting roller for moving the blade from an inoperative position to a cutting position against the taking roller and to return the blade to the inoperative position after the cutting of the plasticizer film.

14. The automatic plasticizing equipment according to claim 8, wherein, relative to the first plasticizing device or the second plasticizing device, the taking roller is heated for thermo-setting adhesive plasticizer film or plasticizer films of two different typologies.

15. The automatic plasticizing equipment according to claim 1, wherein said equipment is fed by an image strip for said image sheets, which unwinds from an image strip spool and supports the enhanced sheet codes (ESC) associated to said image sheets and further comprising a winding device controlled by the electronic control unit for winding in an enhanced image spool the plasticized and non-plasticized image sheets.

16. An automatic plasticizing equipment for image sheets comprising a first plasticizing device and an electronic control unit, wherein said first plasticizing device employs a first plasticizer film unwinding from a first film spool,
wherein said equipment processes image sheets with associated enhanced sheet codes (ESC), readable by machine, having dimensional and finishing information associated to said image sheets;
said equipment further comprises one or more enhancement devices among another plasticizing equipment, an embossing device, a metalizing device and a browning device, activable, respectively, for plasticizing, embossing, metalizing, and browning the image sheets;
the electronic control unit responds to the dimensional and finishing information from the enhanced sheet codes (ESC) for selectively activating the another plasticizing equipment and/or the embossing device and/or the metalizing device and/or the browning device for obtaining enhanced image sheets of different typology; and
wherein said electronic control unit responds to the dimensional and finishing information from the enhanced sheet codes (ESC) for selectively activating the first plasticizing device or one or more of said one or more enhancement devices or to leave automatic plasticizing equipment and said one or more enhancement devices deactivated so as to obtain plasticized image sheets of different typologies of plasticization or embossed image sheets and/or metalized image sheets and/or browned image sheets or non-plasticized image sheets.

17. The automatic plasticizing equipment according to claim 16, wherein the metalizing device is of ink jet type and wherein, downstream from the metalizing device, said automatic plasticizing equipment further comprises a fixing UV spot device.

18. The automatic plasticizing equipment of claim 16, wherein the browning device is of metal-foil type and wherein said browning device is preceded by a gluing device of ink jet type and said gluing device is controlled by the electronic control unit for depositing an adhesive layer in areas of the image sheets provided for the browning.

* * * * *